(12) United States Patent
Sriram et al.

(10) Patent No.: US 9,585,153 B2
(45) Date of Patent: Feb. 28, 2017

(54) METHOD AND APPARATUS FOR IMPROVED CARRIER AGGREGATION ACCESS CONTROL

(71) Applicant: Alcatel-Lucent USA Inc., Murray Hill, NJ (US)

(72) Inventors: Sundar R. Sriram, Murray Hill, NJ (US); Kannan T Konda, Aurora, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 139 days.

(21) Appl. No.: 14/575,696

(22) Filed: Dec. 18, 2014

(65) Prior Publication Data

US 2016/0183260 A1    Jun. 23, 2016

(51) Int. Cl.
*H04W 72/04*  (2009.01)

(52) U.S. Cl.
CPC .................. *H04W 72/048* (2013.01)

(58) Field of Classification Search
CPC ................................. H04W 72/0453
USPC ........................ 370/310, 328, 329
See application file for complete search history.

(56) References Cited

U.S. PATENT DOCUMENTS

| | | | |
|---|---|---|---|
| 8,989,044 B2* | 3/2015 | Larsson | H04L 5/0032 370/252 |
| 9,253,729 B1* | 2/2016 | Sundar | H04W 52/0261 |
| 2009/0170426 A1* | 7/2009 | Jung | H04W 8/24 455/7 |
| 2011/0014912 A1* | 1/2011 | Ahluwalia | H04W 76/021 455/435.1 |
| 2011/0256855 A1* | 10/2011 | Wang | H04W 8/24 455/418 |
| 2012/0157100 A1* | 6/2012 | Suzuki | H04W 48/18 455/435.2 |
| 2012/0184281 A1* | 7/2012 | Kim | H04W 28/048 455/450 |
| 2012/0250625 A1* | 10/2012 | Kim | H04L 5/001 370/328 |
| 2013/0016690 A1* | 1/2013 | Jeong | H04W 24/10 370/329 |
| 2013/0028204 A1* | 1/2013 | Dinan | H04W 72/0453 370/329 |
| 2013/0223395 A1* | 8/2013 | Warken | H04W 76/025 370/329 |
| 2013/0322370 A1* | 12/2013 | Fong | H04W 72/048 370/329 |
| 2014/0161052 A1* | 6/2014 | Kazmi | H04L 5/0041 370/329 |

(Continued)

*Primary Examiner* — Chi H Pham
*Assistant Examiner* — Robert Lopata
(74) *Attorney, Agent, or Firm* — Harness, Dickey & Pierce, P.L.C.

(57) ABSTRACT

Various methods and devices are provided to address the need for improved carrier aggregation access control. In one method, an network node determines (301) that a call involving a UE is eligible for carrier aggregation and sends (302) a request for capability information concerning the UE to an MME. The network node then receives (303) from the MME capability information concerning the UE in response to the request. When the capability information indicates that the UE is not provisioned for carrier aggregation, the network node denies (304) carrier aggregation support for the call involving the UE.

18 Claims, 4 Drawing Sheets

100

(56) References Cited

U.S. PATENT DOCUMENTS

| | | | |
|---|---|---|---|
| 2015/0011210 A1* | 1/2015 | Drevon | H04W 8/10 455/435.2 |
| 2015/0098425 A1* | 4/2015 | Bergljung | H04L 5/001 370/329 |
| 2015/0105120 A1* | 4/2015 | Lim | H04W 36/0022 455/552.1 |
| 2015/0181461 A1* | 6/2015 | Kim | H04W 74/08 370/236 |
| 2015/0256303 A1* | 9/2015 | Belghoul | H04L 5/006 370/329 |
| 2015/0264637 A1* | 9/2015 | Zaus | H04W 48/14 455/434 |
| 2015/0305041 A1* | 10/2015 | Kim | H04W 72/085 370/329 |
| 2015/0327269 A1* | 11/2015 | Kim | H04W 72/0453 370/329 |
| 2015/0334705 A1* | 11/2015 | Zhao | H04W 36/22 370/329 |
| 2015/0359018 A1* | 12/2015 | Li | H04W 76/021 370/329 |
| 2016/0044730 A1* | 2/2016 | Baghel | H04W 76/023 370/329 |
| 2016/0135187 A1* | 5/2016 | Cui | H04L 5/001 370/329 |

* cited by examiner

METHOD AND APPARATUS FOR IMPROVED CARRIER AGGREGATION ACCESS CONTROL

FIELD OF THE INVENTION

The present invention relates generally to communications and, in particular, to carrier aggregation in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Carrier Aggregation (CA) is a key feature of 3GPP LTE-Advanced. By using carrier aggregation, users may gain access to a total bandwidth of up to 100 MHz in order to meet IMT-Advanced requirements. The system bandwidth may be contiguous or composed of several non-contiguous bandwidths, which are aggregated. Also, with CA, a user equipment (UE) may be served by two or more cells, where one of the cells acts as a primary serving cell, while the other cells act as secondary serving cells.

The implementation of carrier aggregation involves changes to the L2 (modem) of eNodeBs to support the carrier aggregation, UE-eNodeB wireless interface. The primary aspects of the CA feature are implemented in the UEs and eNodeBs. In order to support CA, a UE must be a Category 3 UE or greater, and the eNodeB must be configured for CA. If a user brings a Category 3 UE, or higher, to a network and the involved eNodeB supports CA, the user will be able to enjoy the advantages of CA service, provided radio conditions make the call eligible for CA.

While this situation may seem desirable, it may create problems for the network operator. For example, the operator may wish to control access to the CA feature for business reasons or network management reasons, such as network loading control, etc. Thus, new solutions and techniques that enable greater control over access to the carrier aggregation feature would meet a need and advance wireless communications generally.

Figure 1:
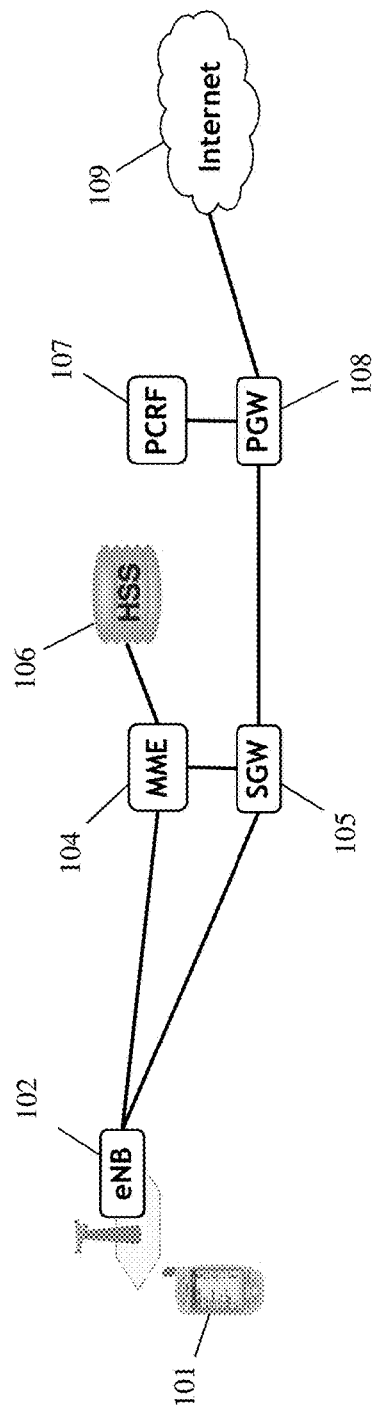
FIG. 1 is a block diagram depiction of a 3GPP LTE wireless network in accordance with certain embodiments of the present invention.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, subdivided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY

Various methods and devices are provided to address the need for improved carrier aggregation access control. In a first method, an eNodeB determines that a call involving a user equipment (UE) is eligible for carrier aggregation and sends a request for capability information concerning the UE to a Mobility Management Entity (MME). The eNodeB then receives from the MME capability information concerning the UE in response to the request. When the capability information indicates that the UE is not provisioned for carrier aggregation, the eNodeB denies carrier aggregation support for the call involving the UE. An article of manufacture is also provided, the article comprising a non-transitory, processor-readable storage medium storing one or more software programs which when executed by one or more processors performs the steps of this first method.

Many embodiments are provided in which this first method is modified. For example, in many embodiments sending the request for capability information involves sending the request after determining that the call involving the UE is eligible for carrier aggregation. In many embodiments, denying carrier aggregation support for the call involving the UE involves configuring wireless resources for non-carrier aggregation service for the UE. Depending on the embodiment, the capability information received from the MME concerning the UE comprises an indication of which carrier aggregation band combinations are provisioned for the UE. In such embodiments, denying carrier aggregation support for the call involves denying support for the call when none of the carrier aggregation band combinations provisioned for the UE are supported by the eNodeB.

In a second method, an MME obtains from a network device capability information for a UE indicating whether the UE is provisioned for carrier aggregation service. The MME receives from an eNodeB a request for capability information for the UE and sends to the eNodeB, in response, capability information indicating whether the UE is provisioned for carrier aggregation service. An article of manufacture is also provided, the article comprising a non-transitory, processor-readable storage medium storing one or more software programs which when executed by one or more processors performs the steps of this second method.

Many embodiments are provided in which this second method is modified. For example, in many embodiments, the MME obtains the capability information indicating whether the UE is provisioned for carrier aggregation service from a Home Subscriber Server (HSS). In many embodiments, the MME obtains this capability information via an Update-LocationAnswer from the HSS. Depending on the embodiment, the capability information obtained comprises an indication of which carrier aggregation band combinations are provisioned for the UE. In such embodiments, sending capability information for the UE to the eNodeB involves sending capability information indicating which carrier aggregation band combinations are provisioned for the UE.

A network node apparatus is also provided. The network node includes a network interface for communication with other network devices, a wireless transceiver, and a processing unit, communicatively coupled to the network interface and the wireless transceiver. The processing unit is configured to determine that a call involving a UE is eligible for carrier aggregation and to send a request for capability information concerning the UE to an MME via the network interface. The processing unit is further configured to receive capability information concerning the UE from the MME via the network interface in response to the request and to deny carrier aggregation support for the call involving the UE when the capability information indicates that the UE is not provisioned for carrier aggregation. Many embodiments are provided in which this network node apparatus is modified. Examples of such embodiments can be found described above with respect to the first method.

A Mobility Management Entity apparatus is also provided and includes a network interface for communication with other network devices and a processing unit, communicatively coupled to the network interface. The processing unit is configured to obtain, from a network device via the network interface, capability information for a UE indicating whether the UE is provisioned for carrier aggregation service. The processing unit is further configured to receive, from a network node via the network interface, a request for capability information for the UE and to send capability information indicating whether the UE is provisioned for carrier aggregation service to the network node via the network interface in response to the request. Many embodiments are provided in which this Mobility Management Entity is modified. Examples of such embodiments can be found described above with respect to the second method.

DETAILED DESCRIPTION OF EMBODIMENTS

To provide a greater degree of detail in making and using various aspects of the present invention, a description of our approach to carrier aggregation access control and a description of certain, quite specific, embodiments follow for the sake of example. FIG. 1 is referenced in an attempt to illustrate an example of a specific system in which the present invention may be embodied.

Diagram 100 of FIG. 1 is a block diagram depiction of an $3^{rd}$ Generation Partnership Project (3GPP) Long Term Evolution (LTE) wireless network in accordance with certain embodiments of the present invention. The wireless network provides service to user equipment (UE) 101 via network node (or eNodeB) 102. Also depicted is Mobility Management Entity (MME) 104, Serving Gateway (SGW) 105, Home Subscriber Server (HSS) 106, Policy and Charging Rules Function (PCRF) 107, and PDN Gateway (PGW) 108 connected to internet 109.

We propose that a network operator be able to provision a subscriber (i.e., a UE) for access to the carrier aggregation (CA) feature. Such provisioning may be implemented in an LTE system by using the existing 3GPP support messaging for the exchange of private Slap messages between eNodeB 102 and MME 104 and S6a messages between MME 104 and HSS 106.

In this example, HSS 106 stores the subscriber-specific provisioning for carrier aggregation access. During the Initial Attach procedure of UE 101, MME 104 obtains the CA provisioning from HSS 106 via the Update-LocationRequest (ULR) and Update-LocationAnswer (ULA) exchange. In 3GPSS TS 36.101, Section 5.5 Table 5.5-1 lists all the 3GPP supported E-UTRA Operating bands. Currently (as of Release 12), 43 bands are supported, Band 1 to Band 44 (Band 6 is NOT supported). Section 5.5A lists all the Operating bands for CA. Table 5.5A-1 lists the Intra-band contiguous CA operating bands. Table 5.5A-2 lists the Inter-band CA operating bands (two bands). Table 5.5A-2a lists Inter-band CA operating bands (three bands). Currently, UL-CA is supported only in Intra-Band contiguous CA. Support for other combinations for UL-CA is to be determined.

The update location procedure is used between MME 104 and HSS 106. The procedure is invoked by the MME 104 to inform HSS 106 regarding the identity of MME 104 and to obtain user subscription data from HSS 106. This procedure involves an Update Location Request (ULR) and Update Location Answer (ULA) being sent over a diameter application. The Attribute-Value Pair (AVP) corresponds to an Information Element in a diameter message (IETF RFC 3588). Diameter AVPs carry specific authentication, accounting, authorization, routing and security information and also configuration details for the request and reply.

We propose adding supportedBandCombinations to the Subscription-Data AVP sent within the ULA to indicate CA band combinations that are supported for the subscriber. The HSS supports adding such additional vendor specific AVPs. For an operator providing service in 3 E-UTRA Bands (Band 2, Band 4, Band 13) and supporting CA in the 5 combinations (CA_2+4, CA_2+13, CA NC_B2, CA 2+2+13, CA_2+4+13), based on the subscriber's profile, the user could be limited to particular allowed CA combinations. For example, a subscriber in a platinum plan may get all 5 combinations, whereas a subscriber in a gold plan may get only 2 of the combinations. MME 104 then stores this CA provisioning information as part of the subscriberCapabilityInformation in the UE context information it maintains for UE 101.

An additional message exchange between eNodeB 102 and MME 104 subsequently occurs when the UE 101 call is eligible for carrier aggregation. eNodeB 102 determines whether the call is CA eligible based on several factors. For example, for a call to be determined eligible for dl-CA configuration, many conditions need to be fulfilled:
 1. Feature activation: The eNodeB needs to support dl-CA when the CallP creates the call context.
 2. Cell Capabilities: the UE needs to be in connected mode in the candidate Pcell (Primary Cell) with a candidate Scell (Secondary cell) configured in the eNodeB. The Scell must be Operational and Available.
 3. UE RRC Capabilities: the UE is Release 10 or greater, UE category is equal or greater than Category 3, Band and Bandwidth combination of Pcell and Scell is supported by the UE.
 4. UE State: UE is not OOT (Out Of TimeAlignment). In order to efficiently manage the limited PUCCH/SRS resources of the air interface among users that have active traffic demand, the eNodeB can voluntarily allow a UE without traffic to lose UL time alignment. According to the 3GPP standards, a UE will release its PUCCH/SRS resource, if TimeAlignment timer expires. This results in a UE being in RRC connected state without consuming PUCCH/SRS resources. A UE in the above state is said to be in OOT state. NOTE: eNodeB is responsible for maintaining a UE in UL sync by sending Timing Advance (TA) commands regularly. The UE is configured with a Time Alignment Timer. If UE doesn't receive any TA command during the period of the TA timer, it considers itself out of UL alignment and autonomously will release the PUCCH/SRS resources. UE still monitors the DL RF signal, will detect PDCCH and receive PDSCH. It cannot transmit on UL except RACH. So this is a mechanism to efficiently manage the PUCCH/SRS resources and also increase the capacity of the eNodeB)

5. Bearer State: VoLTE/VoIP calls result in the creation of a Dedicated bearer with QCI1 to carry voice traffic. Since the traffic on the bearer with QCI1 requries special handling to ensure low latency to guarantee HD Voice Quality, UEs with a QCI1 bearer are not eligible for CA. UEs engaged in an Emergency Call—911 are not considered candidates for CA. All UEs are assigned to Access Classes ranging from 0 to 15. Most Normal Users are in the Access Class 0 to 10. High Priority Users are UEs that belong to any of the 5 Special Access Class categories listed below: 15—PLMN Staff, 14—Emerygency Services, 13—Public Utilities (Water/Gas/Electricity Suppliers), 12—Security Services, 11—For PLMN Use. The UEs belonging to these 5 categories are accorded special previleges in overload situations, emergency conditions or network congestion and are not eligible for CA.

6. Call Characteristics: UE is not established from idle for CSFB normal or emergency (in which case UE will leave EUTRA and not be eligible for CA). Traffic activity, there has to be enough traffic to justify the addition of a Scell.

7. Call Admission Control: Configuring a CA uplink measurement should not exceed the maximum number of UE with CA uplink radio trigger configured for the Pcell.

A call meeting all of the above conditions is deemed CA eligible. If the call is determined to be CA eligible, then eNodeB 102 queries MME 104 for subscriberCapabilityInformation for UE 101 via Slap messaging.

The UECapabilityInformation (already obtained by eNodeB 102) provides the UE Capability which has the supportedBandListEUTRA and supportedBandCombination IE. As indicated earlier, TS36.101 Section 5.5 specifies the operating bands and band combinations for CA. The subscriberCapabilityEnquiry by eNodeB 102 will query MME 104 for the CA specific provisioning information for the subscriber and receive the list of bandCombinations UE 101 is eligible for. Currently the maximum number of EUTRA Frequency Bands Supported is 16 and the maximum number of supportedBandCombinations is 128. (There is a pending 3GPPP change to increase it to 256 by adding a new IE supportedBandCombinationAdd).

For an operator providing service in 3 E-UTRA Bands (Band 2, Band 4, Band 13) and supporting CA in the 5 combinations (CA_2+4, CA_2+13, CA NC_B2, CA 2+2+ 13, CA_2+4+13), the answer to the sub scriberCapability-Enquiry, the subscriberCapabilityInformation, would include a list of bandwidth combinations provisioned for the subscriber. (In 3GPP Rel-12, there is support for CA in Intra-band with 2 DL components (in contiguous and non-contiguous Carrier components, eg. CA_NC_B2: Intra-band Non-Contiguous CA in Band 2) and Inter-band with 3 DL components, including intra-band non-contiguous Carrier Components, eg. CA_2+2+13 is the CA with 3 Component Carriers—2 Component Carriers in Intra-band Non-Contiguous Band 2 and the $3^{rd}$ Component Carrier in Band 13 and CA_2+4+13 is Inter-band CA with 1 Carrier component from Band 2, Band 4 and Band 13.) If the list contains any of the supported combinations, the resources for CA will be configured; otherwise, the call is deemed as not eligible for CA. For example, a subscriber in a platinum plan may be eligible for CA in all the combinations, while a subscriber in a gold plan may be eligible for 4 of the 5 CA combinations and a subscriber in a silver plan may be eligible for CA in only 1 of the 5 CA combinations supported in the network.

Described below is an alternative to the embodiments above in which eNodeB 102 obtains the subscriber-specific provisioning for carrier aggregation access from MME 104. The alternative approach involves restricting the Aggregate Maximum Bit Rate (AMBR) allowed per access point name (APN) for the subscriber. For example, for every APN defined in the HSS and configured for a user, the Max-Requested-Bandwidth in the uplink (UL) and downlink (DL) is provided. During the Initial Attach procedure, the SGW sends the Create Session Request (CSR) to the PGW. As part of the CSR, the SGW sends the APN-AMBR, Bearer Context to be created (including bearer ID, bearer QoS and charging Characteristics). The PGW interacts with the PCRF (Policy and Charging Rules Function) over the Gx interface. As part of the Credit Control-Request/Answer (CCR/CCA) exchange between the PGW and PCRF, PCRF rules can be used to modify the QoS of the bearer context to be created (so the AMBR, Max-Requested-Bandwidth in UL or DL or both UL and DL can be modified) for the subscriber. For example, in the ULA, all subscribers may be assigned 256 MB for Max-Requested-Bandwidth in the UL and DL, but a subscriber in a platinum plan may be assigned 2 GB for Max-Requested-Bandwidth in DL, 1 GB in UL. A subscriber in Gold plan may get 1 GB for DL and 512 MB for UL. The problem with this approach is that we would be throttling the throughput and controlling the user experience but not preventing the configuration of dl-CA for the subscribers and allocation of SCell Radio Resource between UE and eNodeB.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts. In the examples, specific architectures, specific message names, specific message field values, specific messaging formats, and specific messaging sequences are all provided for the purpose of illustrating possible embodiments of the present invention and should not be interpreted as restricting or limiting the scope of the broader inventive concepts.

Figure 2:
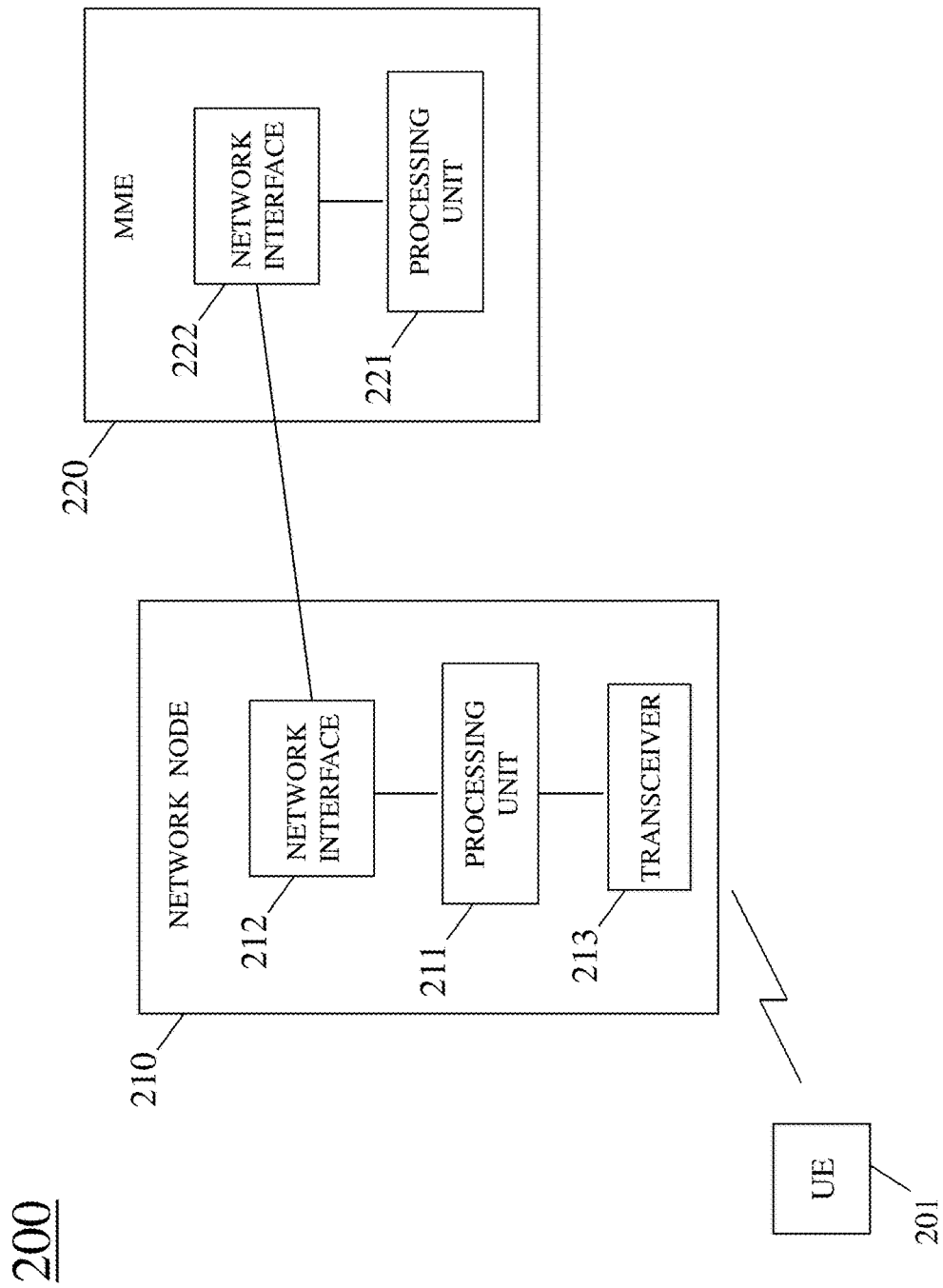
FIG. 2 is a block diagram depiction of a network node and MME in accordance with various embodiments of the present invention.
Figure 3:
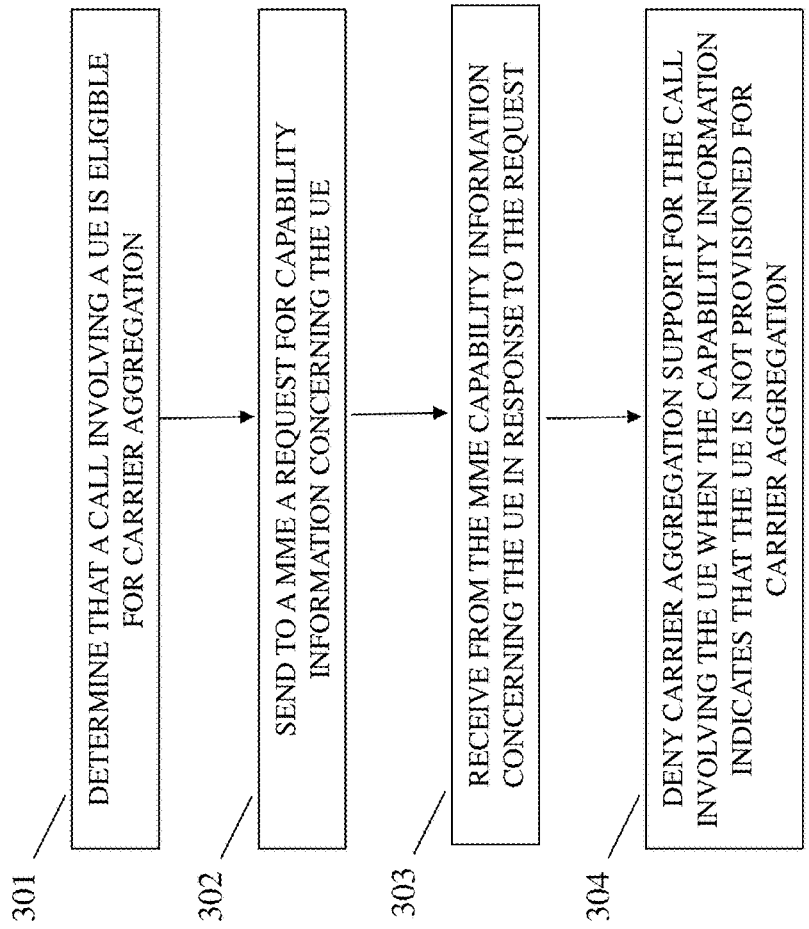
FIG. 3 is a logic flow diagram of functionality performed by a network node in accordance with various embodiments of the present invention.
Figure 4:
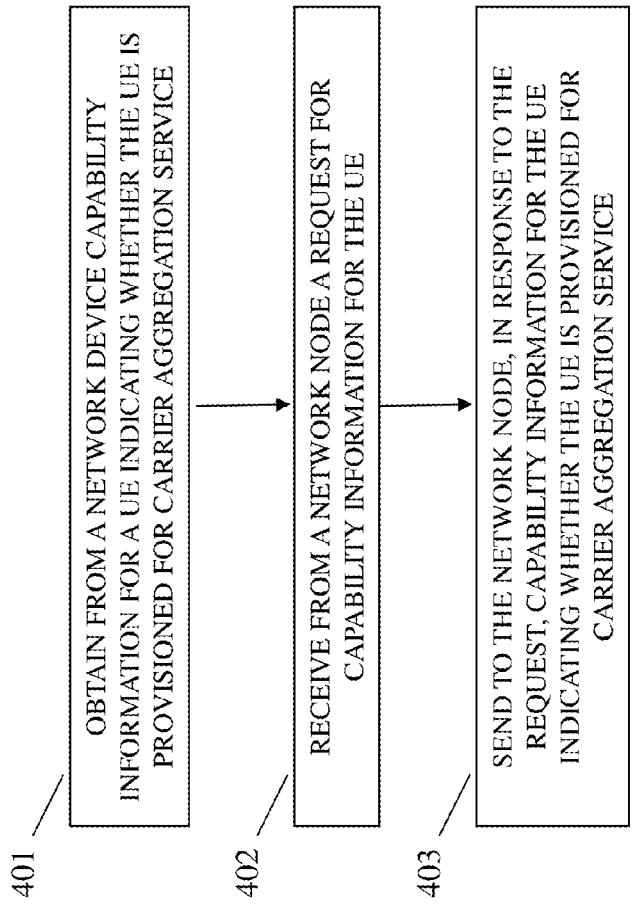
FIG. 4 is a logic flow diagram of functionality performed by an MME in accordance with various embodiments of the present invention.

Having described certain embodiments in detail above, a review of the more general aspects common to many of the embodiments of the present invention can be understood with reference to FIGS. 2-4. Diagram 200 of FIG. 2 depicts a network node 210 and Mobility Management Entity (MME) 220 in accordance with various embodiments of the present invention. Network node 210 and MME 220 include processing units 211 and 221 and network interfaces 212 and 222, respectively. Network node 210 also includes wireless transceiver 213.

Those skilled in the art will recognize that the network depiction in FIG. 2 does not show all of the components necessary to operate in a commercial communications system but only those components and logical entities particularly relevant to the description of embodiments herein. For example, network nodes are known to comprise processing units, network interfaces, and wireless transceivers, while MME's are known to comprise processing units and network interfaces. In general, such components are well-known. For example, processing units are known to comprise basic components such as, but neither limited to nor necessarily requiring, components from a group that includes microprocessors, microcontrollers, memory devices, application-specific integrated circuits (ASICs), and logic circuitry. Such components are typically adapted to implement algorithms or protocols that have been expressed using high-level design languages or descriptions, expressed using computer instructions, expressed using signaling flow diagrams, or expressed using logic flow diagrams.

Thus, given a high-level description, an algorithm, a logic flow, a messaging/signaling flow, or a protocol specification, those skilled in the art are aware of the many design and development techniques available to implement a processing unit that performs the given logic. Therefore, network node 210 and MME 220, for example, represent known devices that have been adapted, in accordance with the description herein, to implement multiple embodiments of the present invention. Furthermore, those skilled in the art will recognize that aspects of the present invention may be implemented in or across various physical components and none are necessarily limited to single platform implementations.

In the example of FIG. 2, MME processing unit 221 obtains, from a network device (such as an HSS, depending on the embodiment) via network interface 222, capability information for UE 201 indicating whether UE 201 is provisioned for carrier aggregation service. Network node processing unit 211 determines that a call involving UE 201 is eligible for carrier aggregation and sends a request for capability information concerning UE 201 to MME 220 via network interface 212. MME processing unit 221 receives the request via network interface 222 and then in response sends capability information indicating whether UE 201 is provisioned for carrier aggregation service to network node 210 via the network interface 222. Network node processing unit 211 receives the capability information via network interface 212. When the capability information indicates that the UE is not provisioned for carrier aggregation, network node processing unit 211 denies carrier aggregation support for the UE 201 call.

Aspects of embodiments of the present invention can be understood with reference to FIG. 3. Diagram 300 of FIG. 3 is a logic flow diagram of functionality performed by a network node in accordance with various embodiments of the present invention. In the method depicted in diagram 300, an network node determines (301) that a call involving a UE is eligible for carrier aggregation and sends (302) a request for capability information concerning the UE to an MME. The network node then receives (303) from the MME capability information concerning the UE in response to the request. When the capability information indicates that the UE is not provisioned for carrier aggregation, the network node denies (304) carrier aggregation support for the call involving the UE.

Many embodiments are provided herein in which the method and logic flow above may be modified. For example, in many embodiments, sending the request for capability information involves sending the request after determining that the call involving the UE is eligible for carrier aggregation. In many embodiments, denying carrier aggregation support for the call involving the UE involves configuring wireless resources for non-carrier aggregation service for the UE. Depending on the embodiment, the capability information received from the MME concerning the UE comprises an indication of which carrier aggregation band combinations are provisioned for the UE. In such embodiments, denying carrier aggregation support for the call involves denying support for the call when none of the carrier aggregation band combinations provisioned for the UE are supported by the network node.

Diagram 400 of FIG. 4 is a logic flow diagram of functionality performed by an MME in accordance with various embodiments of the present invention. In the method depicted in diagram 400, an MME obtains (401) from a network device capability information for a UE indicating whether the UE is provisioned for carrier aggregation service. The MME receives (402) from a network node a request for capability information for the UE and sends (403) to the network node, in response, capability information indicating whether the UE is provisioned for carrier aggregation service.

Many embodiments are provided herein in which the method and logic flow above may be modified. For example, in many embodiments, the MME obtains the capability information indicating whether the UE is provisioned for carrier aggregation service from an HSS. In many embodiments, the MME obtains this capability information via an Update-LocationAnswer from the HSS. Depending on the embodiment, the capability information obtained comprises an indication of which carrier aggregation band combinations are provisioned for the UE. In such embodiments, sending capability information for the UE to the eNodeB involves sending capability information indicating which carrier aggregation band combinations are provisioned for the UE.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms "a" or "an", as used herein, are defined as one or more than one. The term "or", as used herein, is defined as an inclusive or, which is satisfied by one or more than one of objects being present or true. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms "including" or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for improved carrier aggregation access control, the method comprising:
   determining by an eNodeB that a call involving a user equipment (UE) is eligible for carrier aggregation;
   sending, by the eNodeB to a Mobility Management Entity (MME), a request for capability information concerning the UE after determining that the call involving the UE is eligible for carrier aggregation;
   receiving, by the eNodeB from the MME, capability information concerning the UE in response to the request;
   denying, by the eNodeB, carrier aggregation support for the call involving the UE when the capability information indicates that the UE is not provisioned for carrier aggregation.

2. The method as recited in claim 1, wherein denying carrier aggregation support for the call involving the UE comprises
   configuring wireless resources for non-carrier aggregation service for the UE.

3. The method as recited in claim 1, wherein receiving, by the eNodeB from the MME, capability information concerning the UE comprises
   receiving an indication of which carrier aggregation band combinations are provisioned for the UE.

4. The method as recited in claim 3, wherein denying carrier aggregation support for the call involving the UE comprises
   denying carrier aggregation support for the call involving the UE when none of the carrier aggregation band combinations provisioned for the UE are supported by the eNodeB.

5. A method for improved carrier aggregation access control, the method comprising:
   obtaining, by a Mobility Management Entity (MME) from a network device, capability information for a user equipment (UE) indicating whether the UE is provisioned for carrier aggregation service;
   receiving, by the MME from an eNodeB, a request for capability information for the UE after determining that the call involving the UE is eligible for carrier aggregation;
   sending, by the MME to the eNodeB in response to the request, capability information for the UE indicating whether the UE is provisioned for carrier aggregation service.

6. The method as recited in claim 5, wherein obtaining from a network device capability information for the UE comprises
   obtaining, by the MME from a Home Subscriber Server (HSS), capability information for the UE indicating whether the UE is provisioned for carrier aggregation service.

7. The method as recited in claim 6, wherein obtaining from the HSS capability information for the UE comprises
   obtaining, via an Update-LocationAnswer from the HSS, capability information for the UE indicating whether the UE is provisioned for carrier aggregation service.

8. The method as recited in claim 5, wherein obtaining from a network device capability information for the UE comprises
   obtaining an indication of which carrier aggregation band combinations are provisioned for the UE.

9. The method as recited in claim 8, wherein sending capability information for the UE indicating whether the UE is provisioned for carrier aggregation service comprises
   sending capability information for the UE indicating which carrier aggregation band combinations are provisioned for the UE.

10. A network node comprising:
    a network interface for communication with other network devices;
    a wireless transceiver; and
    a processing unit, communicatively coupled to the network interface and the wireless transceiver, configured
      to determine that a call involving a user equipment (UE) is eligible for carrier aggregation,
      to send, to a Mobility Management Entity (MME) via the network interface, a request for capability information concerning the UE after determining that the call involving the UE is eligible for carrier aggregation,
      to receive, from the MME via the network interface, capability information concerning the UE in response to the request, and
      to deny carrier aggregation support for the call involving the UE when the capability information indicates that the UE is not provisioned for carrier aggregation.

11. The network node as recited in claim 10, wherein being configured to deny carrier aggregation support for the call involving the UE comprises
    being configured to configure wireless resources for non-carrier aggregation service for the UE.

12. The network node as recited in claim 10, wherein being configured to receive capability information concerning the UE comprises being configured to receive an indication of which carrier aggregation band combinations are provisioned for the UE.

13. The network node as recited in claim 12, wherein being configured to deny carrier aggregation support for the call involving the UE comprises being configured to deny carrier aggregation support for the call involving the UE when none of the carrier aggregation band combinations provisioned for the UE are supported by the network node.

14. A Mobility Management Entity (MME) comprising:
a network interface for communication with other network devices; and
a processing unit, communicatively coupled to the network interface, configured
to obtain, from a network device via the network interface, capability information for a user equipment (UE) indicating whether the UE is provisioned for carrier aggregation service,
to receive, from a network node via the network interface, a request for capability information for the UE after determining that communication involving the UE is eligible for carrier aggregation, and
to send, to the network node via the network interface in response to the request, capability information for the UE indicating whether the UE is provisioned for carrier aggregation service.

15. The MME as recited in claim 14, wherein being configured to obtain from a network device capability information for the UE comprises being configured to obtain, from a Home Subscriber Server (HSS), capability information for the UE indicating whether the UE is provisioned for carrier aggregation service.

16. The MME as recited in claim 15, wherein being configured to obtain from the HSS capability information for the UE comprises being configured to obtain, via an Update-LocationAnswer from the HSS, capability information for the UE indicating whether the UE is provisioned for carrier aggregation service.

17. The MME as recited in claim 14, wherein being configured to obtain from a network device capability information for the UE comprises being configured to obtain an indication of which carrier aggregation band combinations are provisioned for the UE.

18. The MME as recited in claim 17, wherein being configured to send capability information for the UE indicating whether the UE is provisioned for carrier aggregation service comprises being configured to send capability information for the UE indicating which carrier aggregation band combinations are provisioned for the UE.

* * * * *